(12) United States Patent
Andrade Costa et al.

(10) Patent No.: US 11,121,951 B2
(45) Date of Patent: *Sep. 14, 2021

(54) NETWORK RESILIENCY THROUGH MEMORY HEALTH MONITORING AND PROACTIVE MANAGEMENT

(71) Applicant: International Business Machines Corporation, Armonk, NY (US)

(72) Inventors: Carlos H. Andrade Costa, White Plains, NY (US); Chen-Yong Cher, Port Chester, NY (US); Yoonho Park, Chappaqua, NY (US); Bryan S. Rosenburg, Cortlandt Manor, NY (US); Kyung D. Ryu, New City, NY (US)

(73) Assignee: International Business Machines Corporation, Armonk, NY (US)

( * ) Notice: Subject to any disclaimer, the term of this patent is extended or adjusted under 35 U.S.C. 154(b) by 970 days.

This patent is subject to a terminal disclaimer.

(21) Appl. No.: 15/817,254

(22) Filed: Nov. 19, 2017

(65) Prior Publication Data

US 2018/0097712 A1 Apr. 5, 2018

Related U.S. Application Data

(63) Continuation of application No. 14/453,879, filed on Aug. 7, 2014, now Pat. No. 9,825,827.

(51) Int. Cl.
*H04L 12/26* (2006.01)
*H04L 12/24* (2006.01)

(52) U.S. Cl.
CPC ...... *H04L 43/0817* (2013.01); *H04L 41/0663* (2013.01); *H04L 41/0668* (2013.01); *H04L 41/147* (2013.01)

(58) Field of Classification Search
CPC .......... G06N 5/04; G06N 99/005; G06N 5/02; G06N 5/003; G06N 5/24; G06Q 30/02; H04L 12/24; H04L 12/26; H04L 41/0663; H04L 41/0668; H04L 41/12; H04L 41/147; H04L 43/0817; H04L 45/00; H04L 45/02; G06F 11/1666; G06F 11/20; G06F 11/2092

See application file for complete search history.

(56) References Cited

U.S. PATENT DOCUMENTS

| | | |
|---|---|---|
| 6,782,350 B1 | 8/2004 | Burnley et al. |
| 7,143,153 B1 | 11/2006 | Black et al. |
| 8,230,058 B2 | 7/2012 | Joels et al. |

(Continued)

OTHER PUBLICATIONS

Mateos, G. et al.; "Dynamic network cartography: advances in network health monitoring"; IEEE Signal Processing Magazine, vol. 30, No. 3, pp. 129-143, May 2012.

(Continued)

*Primary Examiner* — Li Wu Chang
(74) *Attorney, Agent, or Firm* — Daniel Morris; Otterstedt, Wallace & Kammer, LLP

(57) ABSTRACT

A method for managing a network queue memory includes receiving sensor information about the network queue memory, predicting a memory failure in the network queue memory based on the sensor information, and outputting a notification through a plurality of nodes forming a network and using the network queue memory, the notification configuring communications between the nodes.

13 Claims, 4 Drawing Sheets

(56) References Cited

U.S. PATENT DOCUMENTS

| | | | |
|---|---|---|---|
| 2001/0034853 A1* | 10/2001 | Takatama | H04Q 3/66 |
| | | | 714/38.14 |
| 2004/0139365 A1 | 7/2004 | Hosoya | |
| 2009/0161430 A1* | 6/2009 | Allen | G11C 29/76 |
| | | | 365/185.09 |
| 2011/0019535 A1 | 1/2011 | Nakashima et al. | |
| 2013/0064102 A1 | 3/2013 | Chang et al. | |

OTHER PUBLICATIONS

Yi, R. et al.; "FoSBaS: a bi-directional secrecy and collusion resilience key management scheme for BANs"; IEEE Wireless Communications and Networking Conference (WCNC); pp. 2841-2846; IEEE; Apr. 1-4, 2012.

Macquarrie, I. et al.; "Fabric Resiliency Best Practices"; IBM Corporation; http://www.redbooks.ibm.com/abstracts/redp4722.html?Open; May 12, 2012.

Gopalakrishnan, R. et al.; "Improve Application Resiliency with IBM WebSphere Network Deployment V8.5"; IBM Corporation; http://www.redbooks.ibm.com/Redbooks.nsf/RedbookAbstracts/redp4990.html?Open; May 10, 2013.

Krutov, I.; "Reliability, Availability, and Serviceability Features of the IBM eX5 Portfolio"; IBM Corporation; http://www.redbooks.ibm.com/abstracts/redp4864.html; May 10, 2012.

Bianca Schroeder et al. "DRAM Errors in the Wild: A Large-Scale Field Study", SIGMETRICS/Performance 2009, pp. 1-12, Jun. 15-19, 2009, Seattle, WA, USA.

Paul J. Otterstedt, List of IBM Patents or Patent Applications Treated as Related, pp. 1-2, Nov. 19, 2017.

\* cited by examiner

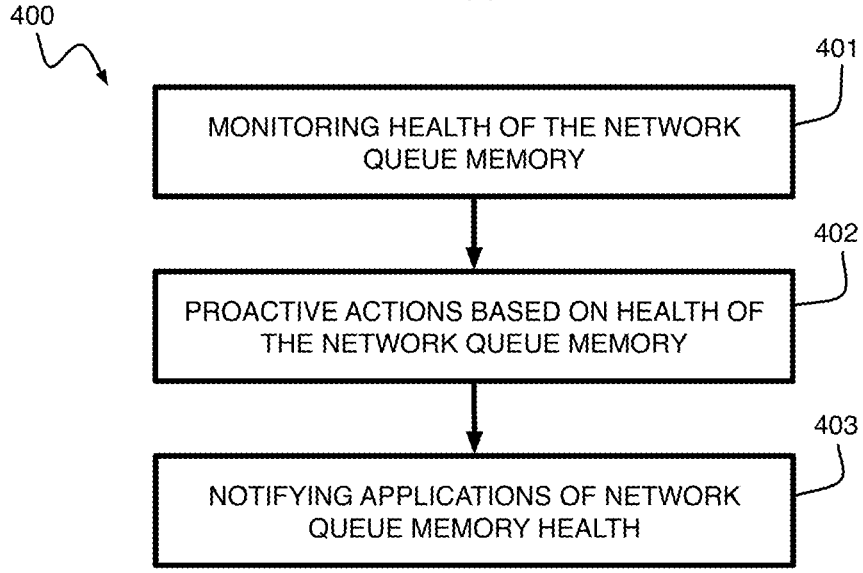
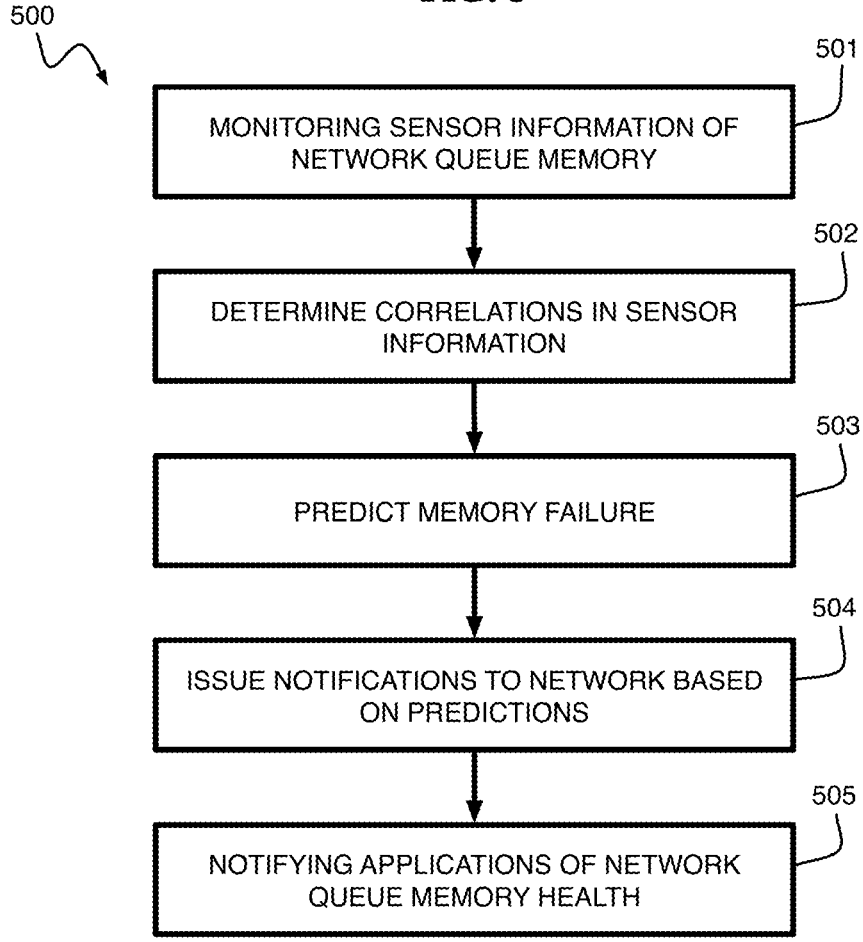

NETWORK RESILIENCY THROUGH MEMORY HEALTH MONITORING AND PROACTIVE MANAGEMENT

CROSS-REFERENCE TO RELATED APPLICATIONS

This application is a continuation of U.S. patent application Ser. No. 14/453,879 filed 7 Aug. 2014, the complete disclosure of which is expressly incorporated herein by reference in its entirety for all purposes.

GOVERNMENT LICENSE RIGHTS

This invention was made with Government support under Contract No.: B599858 awarded by Department of Energy. The Government has certain rights in this invention.

BACKGROUND

The present disclosure relates to memory management, and more particularly to predicting memory failure in network queue memory.

Memory errors in a computer system can significantly affect performance of the system. Methods for mitigating the effects of the error include error-correcting code, fast failure detection/notification mechanisms, self-healing network, etc. Methods for dealing with errors can improve the performance of the computer system using the memory.

BRIEF SUMMARY

According to an exemplary embodiment of the present invention, a method for managing a network queue memory includes receiving sensor information about the network queue memory, predicting a memory failure in the network queue memory based on the sensor information, and outputting a notification through a plurality of nodes forming a network and using the network queue memory, the notification configuring communications between the nodes.

BRIEF DESCRIPTION OF THE SEVERAL VIEWS OF THE DRAWINGS

Preferred embodiments of the present invention will be described below in more detail, with reference to the accompanying drawings:

FIG. 4 is a flow diagram of a method for monitoring and managing network memory according to an exemplary embodiment of the present invention;

FIG. 5 is a flow diagram of a method for monitoring and managing network memory according to an exemplary embodiment of the present invention.

DETAILED DESCRIPTION

According to an exemplary embodiment of the present invention, a monitor collects information about network queue memory within a network and predicts memory failure based on the information. The monitor manages the network, routing data based on the predicted failure. The monitor can notify the nodes of the predicted failure. The monitor can further notifies network clients using any network queue memory associated with the predicted failure. These network clients execute, for example, middleware and application software, using the network queue memory.

Figure 1:
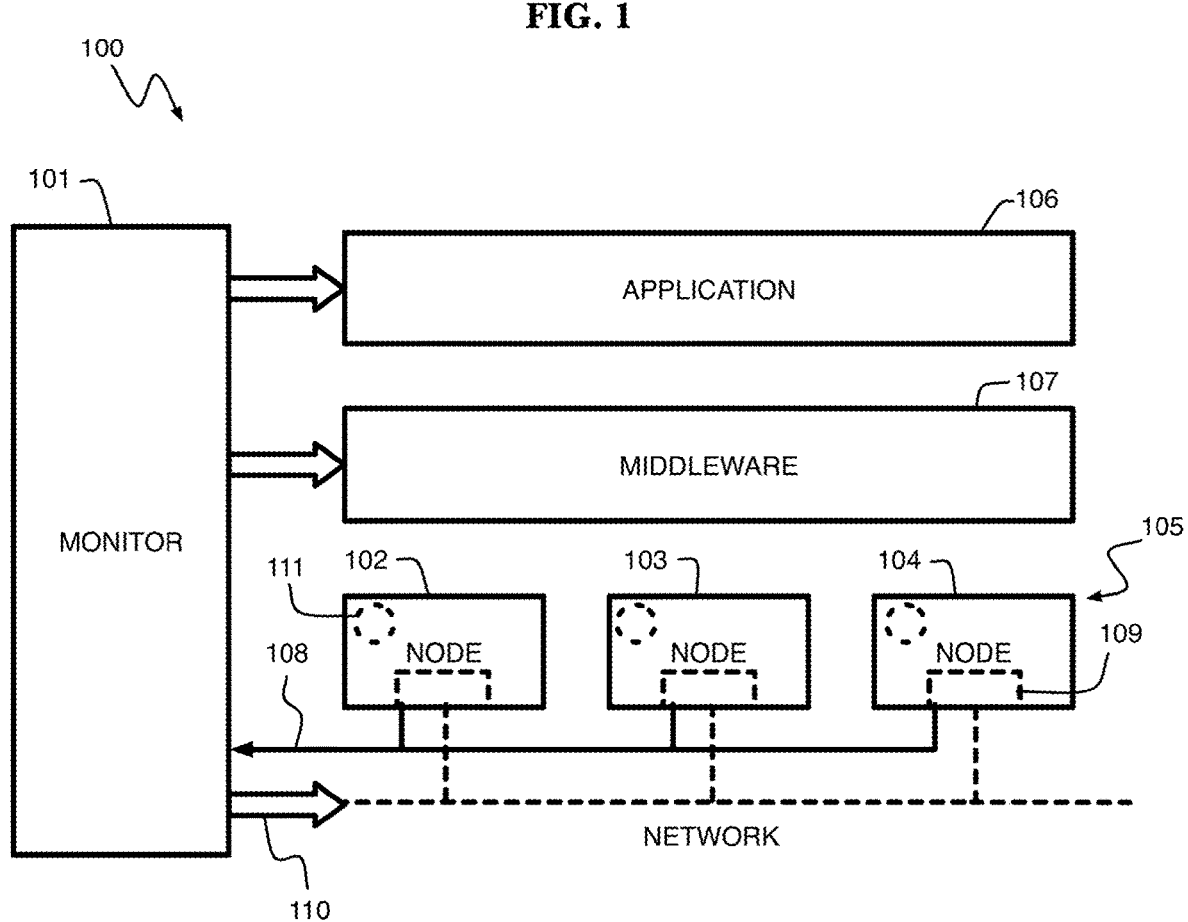
FIG. 1 is an illustration of a system configured to monitor and manage network memory according to an exemplary embodiment of the present invention.

Referring to FIG. 1, a system 100 comprises a monitor 101, and one or more nodes (e.g., 102-104) forming a network 105, wherein a plurality of the nodes each include a block of network queue memory e.g., 109. The system 100 further comprises one or more network clients executing software, e.g., an application 106 or middleware 107, using the nodes and their network queue memory. In one or more embodiments, each node stores network data in transit through the network, and transmits sensor information about the health of network queue memory to the monitor (e.g., using a communications bus 108). The monitor 101 predicts failures in the network queue memory based on the sensor information about the health of the network queue memory. This prediction can be done dynamically at runtime.

In one or more embodiments of the present invention, the sensor information includes error counts, information about error-correcting code (ECC) activity, power variations, thermal variations, aging variations, etc. Other sensor information may be monitored. In one example, corrected error rate and use health (e.g., wear) are used to calculate a probability of failure in the event of an increasing corrected error rate.

According to an embodiment of the present invention, the sensor information is collected through sensors (e.g., 111) used to detect or indicate, for example, electromigration (EM) (i.e., gradual displacement of metal atoms in a semiconductor), negative bias temperature instability (NBTI) manifesting as an increase in a threshold voltage and a consequent decrease in drain current and transconductance), positive bias temperature instability (PBTI) manifesting as a donor-like interface state near source and drain junctions of a memory, temperature-dependent dielectric breakdown (TDDB) manifesting as a loss of insulation between neighboring interconnects, and hot carrier injection (HCI) where an electron gains sufficient kinetic energy to overcome a potential barrier and breaks an interface state, among other conditions.

Having predicted a failure in the network queue memory based on the sensor information, the monitor 101 issues one or more notifications, e.g., 110. In at least one embodiment, the monitor 101 sends a first notification to the one or more of the nodes forming the network 105. Notifications to the nodes can be used to affect the routing of messages among the nodes. In one or more embodiments, the monitor 101 sends a second notification to one or more of the network clients using the nodes.

In one or more embodiments of the present invention, each notification 110 is a signal or message from the monitor 101. Notifications can be used to control messaging among the nodes and/or transmit information about the performance of the network queue memory due the effects of one or more conditions (e.g., a predicted memory failure and a time window for action).

Figure 2:
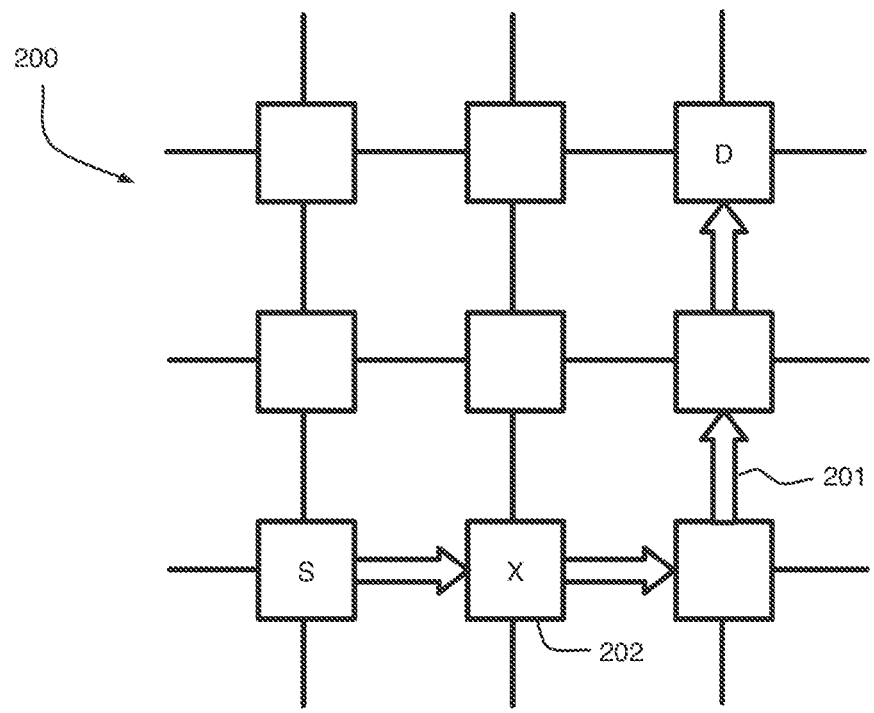
FIG. 2 is an illustration of a first route in a network according to an exemplary embodiment of the present invention.
Figure 3:
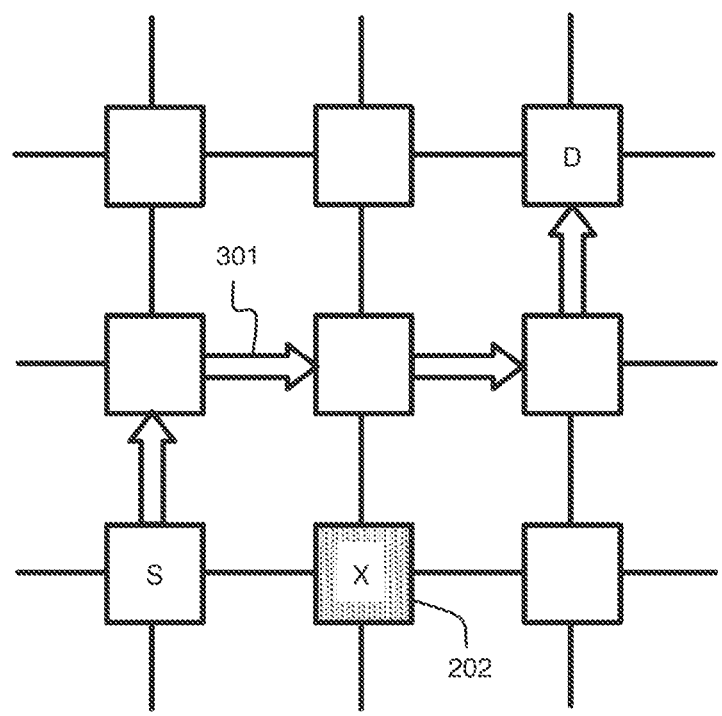
FIG. 3 is an illustration of a second route in a network according to an exemplary embodiment of the present invention.

FIG. 2 illustrates a case where all nodes of network 200 have healthy network queue memory, and a route 201 (indicated by arrows) is chosen through node X 202. FIG. 3 illustrates an example wherein a monitor predicts that network queue memory located at node X 201 is likely to fail.

In FIG. 3, the monitor has detected a correlation between the sensor information and a failure model and has predicted a memory failure. In at least one embodiment, the monitor accesses hardware-specific health indicators (e.g., sensors) at the nodes and generates a hardware-independent notification of memory health deterioration. In some embodiments, the monitor notifies nodes of a predicted failure in a memory or memory segment based on memory health deterioration.

According to an embodiment of the present invention, the prediction of memory failure includes determining a failure probability using a failure model and a failure probability threshold. The failure model can output a failure probability having a specified prediction accuracy (e.g., confidence), an action time window (e.g., a time during which the memory is likely to fail), etc. A hardware-independent signal is generated when the failure probability exceeds the failure probability threshold. In an exemplary case, a real-time corrected memory error rate is determined via memory error monitoring, and the failure probability is determined using known failure models. For example, a correlation can be made between the corrected memory error rate, the probability of a memory failure and the failure probability threshold, which accounts for a predefined action time window or a prediction accuracy. When an increase in the corrected memory error rate is observed, a failure probability is evaluated based on the corrected memory error rate (sensor information) and failure model. When a failure probability threshold is exceeded, a hardware-independent signal is triggered indicating the memory portion associated with the failure probability and an action time window of when a failure will likely occur in the memory portion. In some embodiments, the hardware-independent signal indicates a particular segment of the memory that is likely to fail. Referring again to FIG. 3, it can be seen that a new route 301 is chosen to by-pass node X 201 based on the sensor information and a resultant prediction of memory failure at node X 201.

According to an exemplary embodiment of the present invention, a method 400 (see FIG. 4) for monitoring and managing network queue memory includes monitoring the health of the network queue memory (401), taking proactive actions (402), and notifying network clients, including applications and middleware using the network, of network queue memory health, enabling the network clients to react (403).

At block 401, a monitor collects sensor information indicating the health of network queue memory in a plurality of nodes. The sensor information includes, for example, information about the ECC activity/operations performed by the network queue memory and/or nodes. In one or more embodiments of the present invention, the monitor targets memory used for queues by the network of nodes, different than a memory used by a processor (e.g., cache) in the network. According to an embodiment of the present invention, the network queue memory is installed in a system such as a massively parallel computer or supercomputer such as a Blue Gene/Q (BGQ) torus network implementing 16 gigabits (GB) of static random-access memory (SRAM) per node. In one example, the network queue memory is disposed among a plurality of compute nodes having SRAM using ECC. The ECC is used to detect and correct internal errors. Both correctable and uncorrectable errors are reported to the monitor. The monitor predicts memory failure and determines when to take proactive action to improve/ensure network reliability. In the exemplary application, for SRAM based network queue, predictions based on correctable errors (sensor information) can be made for the links of a node.

It should be understood that the computer systems described herein are non-limiting examples, and that embodiments disclosed herein for predicting network queue memory failure are applicable to a variety of computer systems.

According to an embodiment of the present invention, at block 402, the proactive action includes for example, rerouting messages within the network to avoid unhealthy links and/or nodes, rerouting messages based on wear leveling to extend the life of links and/or nodes, changing a process layout (e.g., how program variables are mapped to the network queue memory), etc., as shown in FIG. 2 and FIG. 3. More particularly, FIG. 2 shows node S sending messages to node D. All the nodes have healthy network queue memory, and a route is chosen through node X. In FIG. 3, the monitor determines that the network queue memory of node X is unhealthy, which causes the messages to be routed around node X. A messaging unit controller of node S makes the routing change. It should be understood that each node includes an independent messaging unit controller that operates using the notifications received from the other nodes in the network.

According to an embodiment of the present invention, at block 403, network clients, such as applications and middleware using the network queue memory, are notified of the health of the network queue memory of node X. The applications and middleware can react to the notification. For example, an application can adjust its communication topology. In one or more embodiments of the present invention, existing routing schemes are used. These routing schemes are augmented by the notifications (e.g., including information about specific errors in the network) output by the monitor to make proactive decisions about routing.

According to an exemplary embodiment of the present invention, the routing scheme can use the notifications to make decisions about a tradeoff between information collection and speed and accuracy of fault detection and diagnosis in the network (e.g., to manage the frequency of notifications).

According to an exemplary embodiment of the present invention, a monitor (e.g., 101, FIG. 1) is configured to perform method 500 (see FIG. 5) in which network queue memory is monitored and managed using sensor information received from nodes including network queue memory (501). The monitor determines correlations in the sensor information (502) and predicts memory failure (503) based on the correlations. The monitor generates first notifications (504), which are transmitted throughout the network, and which implement proactive actions. These proactive actions configure communications between the nodes. For example, the proactive actions affect the rerouting of messages within the network to avoid unhealthy links and/or nodes, affect the rerouting of messages based on wear leveling to extend the life of links and/or nodes, change a process layout, etc. The monitor generates second notifications (505) to provide network clients, including applications and middleware using the network, with information about the network queue memory health, enabling the network clients to react.

It should be understood that the methodologies of embodiments of the invention may be particularly well-suited for predicting memory failure in network queue memory.

By way of recapitulation, according to an exemplary embodiment of the present invention, a method for managing a network queue memory includes receiving sensor information about the network queue memory, predicting a memory failure in a network queue memory based on the sensor information, and outputting a notification through a plurality of nodes forming a network and using the network queue memory, the notification containing information about the sensor information.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a system for predicting memory failure in network queue memory (see for example, FIG. 1) comprising distinct software modules embodied on one or more tangible computer readable storage media. All the modules (or any subset thereof) can be on the same medium, or each can be on a different medium, for example. The modules can include any or all of the components shown in the figures. In a non-limiting example, the modules include a module for receiving sensor information from network queue memory, a module for predicting memory failure in network queue memory based on the sensor information, and a module for outputting notifications through a network containing information about the sensor information. Further, a computer program product can include a tangible computer-readable recordable storage medium with code adapted to be executed to carry out one or more method steps described herein, including the provision of the system with the distinct software modules.

Figure 6:
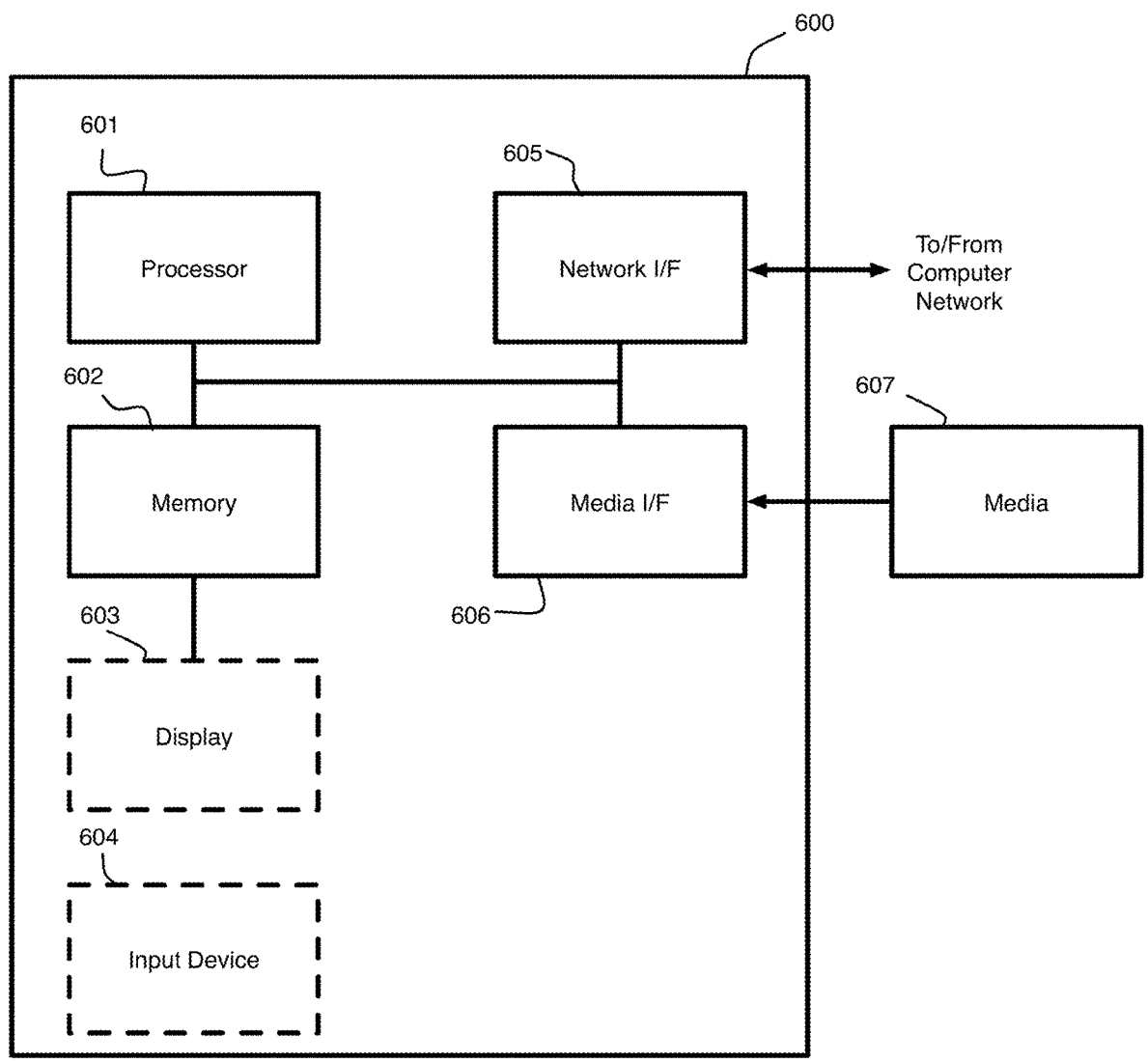
FIG. 6 is a diagram of a system configured to monitor and manage network memory according to an exemplary embodiment of the present invention.

Referring to FIG. 6; FIG. 6 is a block diagram depicting an exemplary computer system for managing network queue memory according to an embodiment of the present invention. The computer system shown in FIG. 6 includes a processor 601, memory 602, display 603, input device 604 (e.g., keyboard), a network interface (I/F) 605, a media IF 606, and media 607, such as a signal source, e.g., camera, Hard Drive (HD), external memory device, etc.

In different applications, some of the components shown in FIG. 6 can be omitted. The whole system shown in FIG. 6 is controlled by computer readable instructions, which are generally stored in the media 607. The software can be downloaded from a network (not shown in the figures), stored in the media 607. Alternatively, a software downloaded from a network can be loaded into the memory 602 and executed by the processor 601 so as to complete the function determined by the software.

The processor 601 may be configured to perform one or more methodologies described in the present disclosure, illustrative embodiments of which are shown in the above figures and described herein. Embodiments of the present invention can be implemented as a routine that is stored in memory 602 and executed by the processor 601 to process the signal from the media 607. As such, the computer system is a general-purpose computer system that becomes a specific purpose computer system when executing routines of the present disclosure.

Although the computer system described in FIG. 6 can support methods according to the present disclosure, this system is only one example of a computer system. Those skilled of the art should understand that other computer system designs can be used to implement embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A method for managing a network queue memory comprising:
receiving sensor information about the network queue memory;
predicting a memory failure in the network queue memory based on the sensor information;
outputting, in response to the prediction of the memory failure, a first notification through a plurality of nodes forming a network, each of the nodes including a block of the network queue memory, the first notification configuring routing of communications between the nodes;
outputting, in response to the prediction of the memory failure, a second notification to a network client executing software using the plurality of nodes and the network queue memory; and
causing, in response to the second notification, the network client to perform at least one maintenance task in response to the notification, wherein the at least one maintenance task includes wear leveling among the nodes and among one or more links connecting the nodes and forming the network by routing the communications between the nodes using the one or more links,
wherein the second notification is output to a plurality of network clients, including the network client, causing each of the plurality of network clients to perform the at least one maintenance task in response to the second notification, wherein the at least one maintenance task includes adjusting a respective communication topology of each of the network clients that configures the communications between the nodes to achieve a wear leveling among the nodes and among one or more links connecting the nodes.

2. The method of claim 1, wherein the sensor information includes information about errors corrected in by one or more of the nodes including the blocks of the network queue memory.

3. The method of claim 1, wherein the sensor information includes information about errors along one or more links connecting the nodes forming the network.

4. The method of claim 1, wherein the sensor information includes an assessment of a degradation process affecting the network queue memory of one or more of the plurality of nodes.

5. The method of claim 1, further comprising collecting, by the plurality of nodes, the sensor information, wherein one or more of the plurality of nodes comprises a sensor.

6. The method of claim 1, wherein the notification configures the routing of the communications between the nodes to route at least one message to by-pass one or more of a node using a faulty link and the faulty link.

7. A computer program product for managing a network queue memory, the computer program product comprising a computer readable storage medium having program instructions embodied therewith, the program instructions executable by a processor to cause the processor to perform a method comprising:
receiving sensor information about the network queue memory;
predicting a memory failure in the network queue memory based on the sensor information;
outputting, in response to the prediction of the memory failure, a first notification through a plurality of nodes forming a network, each of the nodes including a block of the network queue memory, the first notification configuring routing of communications between the nodes;

outputting, in response to the prediction of the memory failure, a second notification to a network client executing software using the plurality of nodes and the network queue memory; and causing, in response to the second notification, the network client to perform at least one maintenance task in response to the notification, wherein the at least one maintenance task includes wear leveling among the nodes and among one or more links connecting the nodes and forming the network by routing the communications between the nodes using the one or more links, wherein the second notification is output to a plurality of network clients, including the network client, causing each of the plurality of network clients to perform the at least one maintenance task in response to the second notification, wherein the at least one maintenance task includes adjusting a respective communication topology of each of the network clients that configures the communications between the nodes to achieve a wear leveling among the nodes and among one or more links connecting the nodes.

8. The computer program product of claim 7, wherein the sensor information includes information about errors corrected in by one or more of the nodes including the blocks of the network queue memory.

9. The computer program product of claim 7, wherein the sensor information includes information about errors along one or more links connecting the nodes forming the network.

10. The computer program product of claim 7, wherein the sensor information includes an assessment of a degradation process affecting the network queue memory of one or more of the plurality of nodes.

11. The computer program product of claim 7, further comprising collecting, by the plurality of nodes, the sensor information, wherein one or more of the plurality of nodes comprises a sensor.

12. The computer program product of claim 7, wherein the notification configures the routing of the communications between the nodes to route at least one message to by-pass one or more of a node using a faulty link and the faulty link.

13. A system comprising:
a plurality of nodes, each of the nodes including a block of network queue memory, the plurality of nodes forming a network; and
a monitor connected to the network and configured to receive sensor information from the plurality of nodes and predict a memory failure in the network queue memory based on the sensor information;
wherein the monitor:
outputs, in response to the prediction of the memory failure, a first notification through the plurality of nodes, the first notification configuring routing of communications between the nodes;
outputs, in response to the prediction of the memory failure, a second notification to a network client executing software using the plurality of nodes and the network queue memory; and
causes, in response to the second notification, the network client to perform at least one maintenance task in response to the second notification, wherein the at least one maintenance task includes wear leveling among the nodes and among one or more links connecting the nodes and forming the network by routing the communications between the nodes using the one or more links,
wherein the second notification is output to a plurality of network clients, including the network client causing each of the plurality of network clients to perform the at least one maintenance task in response to the second notification, wherein the at least one maintenance task includes adjusting a respective communication topology of each of the network clients that configures the communications between the nodes to achieve a wear leveling among the nodes and among one or more links connecting the nodes.

* * * * *